(12) United States Patent
Mager et al.

(10) Patent No.: US 8,752,867 B2
(45) Date of Patent: Jun. 17, 2014

(54) SANITARY HOSE COUPLING

(75) Inventors: Kevin Mager, Mullheim (DE); Werner Kury, Mullheim (DE)

(73) Assignee: Neoperl GmbH, Mullheim (DE)

( * ) Notice: Subject to any disclaimer, the term of this patent is extended or adjusted under 35 U.S.C. 154(b) by 131 days.

(21) Appl. No.: 13/203,924

(22) PCT Filed: Feb. 19, 2010

(86) PCT No.: PCT/EP2010/001057
§ 371 (c)(1),
(2), (4) Date: Aug. 30, 2011

(87) PCT Pub. No.: WO2010/099878
PCT Pub. Date: Sep. 10, 2010

(65) Prior Publication Data
US 2011/0309616 A1     Dec. 22, 2011

(30) Foreign Application Priority Data
Mar. 3, 2009  (DE) .......................... 10 2009 011 411

(51) Int. Cl.
*F16L 33/00* (2006.01)
(52) U.S. Cl.
USPC ........................................................ 285/256
(58) Field of Classification Search
USPC .................... 285/256, 241, 242, 252, 253
See application file for complete search history.

(56) References Cited

U.S. PATENT DOCUMENTS

| 1,678,640 | A | * | 7/1928 | Hall | 285/256 |
| 2,139,745 | A | * | 12/1938 | Goodall | 285/259 |
| 3,237,974 | A | * | 3/1966 | Press | 285/256 |
| 4,330,142 | A | * | 5/1982 | Paini | 285/256 |
| 4,603,888 | A | * | 8/1986 | Goodall et al. | 285/259 |
| 4,817,997 | A | * | 4/1989 | Ingram | 285/256 |
| 5,165,733 | A | * | 11/1992 | Sampson | 285/259 |
| 5,487,571 | A | * | 1/1996 | Robertson | 285/259 |
| 5,853,202 | A | * | 12/1998 | Li et al. | 285/256 |
| 6,318,763 | B1 | * | 11/2001 | Huang | 285/256 |
| 6,394,506 | B1 | * | 5/2002 | Street | 285/256 |
| 6,715,800 | B1 | * | 4/2004 | Hennig | 285/256 |

(Continued)

FOREIGN PATENT DOCUMENTS

| DE | 199 36 413 C1 | 3/2001 |
| FR | 2894 011 A1 | 6/2007 |
| JP | 8226589 A | 9/1996 |

*Primary Examiner* — David E Bochna
(74) *Attorney, Agent, or Firm* — Volpe and Koenig, P.C.

(57) ABSTRACT

A sanitary hose coupling (1) including a tubular coupling base body (2) which, in at least one of the base body end regions thereof, has a hose connector (3) profiled in at least one sub-region for a flexible water hose (4) to be pushed on, and also includes a crimp sleeve (6) which, when deformed, fixes an end (5) of the water hose (4) encompassed by the crimp sleeve (6) on the hose connector (3). The hose coupling (1) provides that the end (5) of the water hose (4) encompassed by the crimp sleeve (6) can be fixed in a rotationally fixed manner on the hose connector (3), and that the end (5) of the hose can be pushed onto a profiled section (7) of the hose connector (3) that is not round in the circumferential direction. Since the hose coupling permits a torque transmission between the water hose (4) and the coupling base body (2), the hose coupling is able to substantially facilitate the mounting and dismantling of a water hose (4) even under restricted spatial conditions.

8 Claims, 3 Drawing Sheets

(56) References Cited

U.S. PATENT DOCUMENTS

| | | | |
|---|---|---|---|
| 6,874,823 B2 * | 4/2005 | Viegener, Walter | 285/256 |
| 7,364,206 B2 * | 4/2008 | Romanelli et al. | 285/256 |
| 7,849,884 B2 * | 12/2010 | Dickel | 285/256 |
| 2010/0194100 A1 | 8/2010 | Koch | |

* cited by examiner

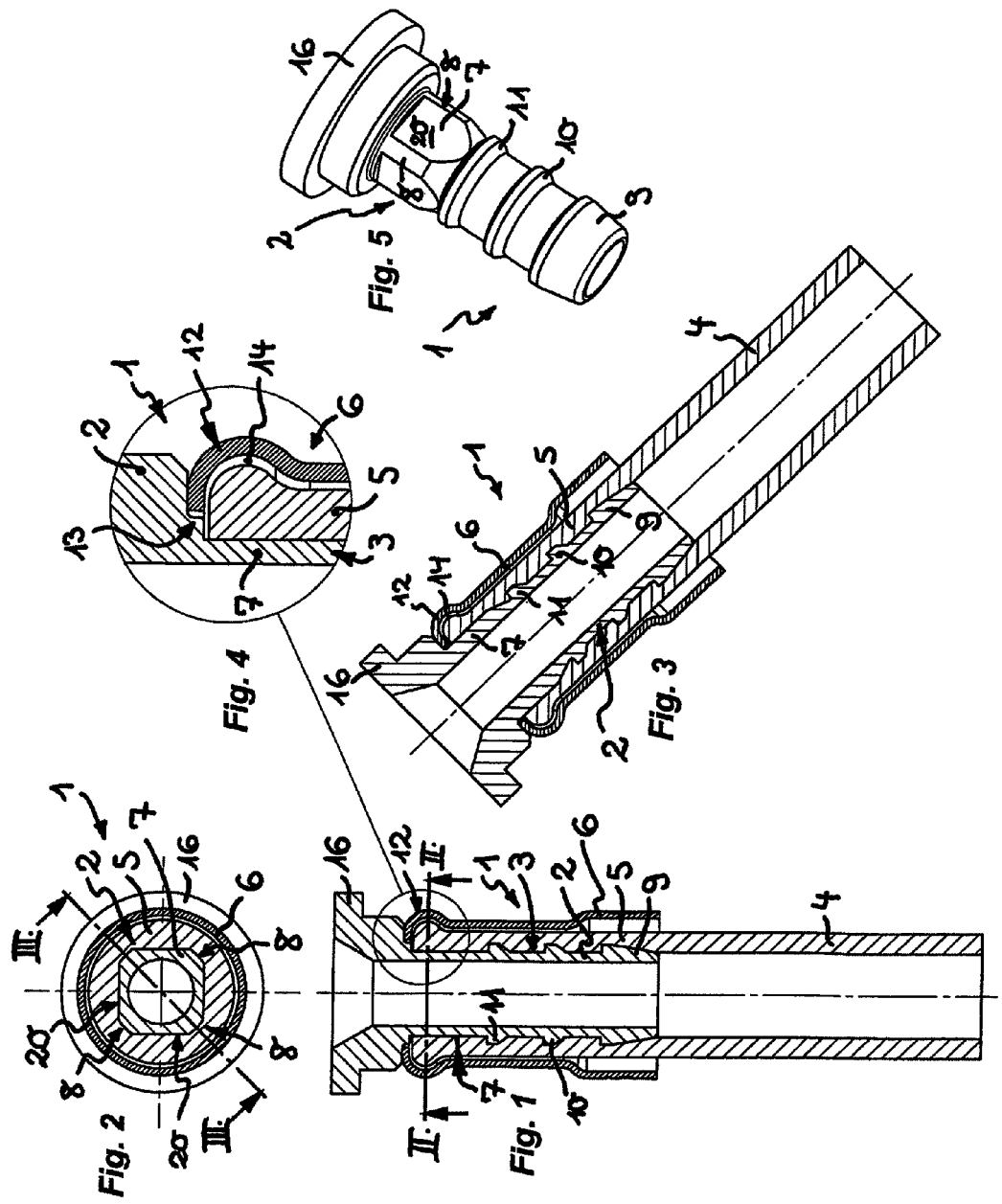

SANITARY HOSE COUPLING

FIELD OF THE INVENTION

The invention relates to a sanitary hose coupling with a tubular coupling base body, which comprises at least at its base body-end section a hose connector profiled, at least in a subsection, for a flexible water hose to be pushed on, as well as a crimp sleeve, which in the deformed state fixes a hose end of the water hose encompassed by the crimp sleeve on the hose connector, wherein the crimp sleeve fixes the water hose on the hose connector in a torque-proof fashion and wherein the hose end can be pushed onto profiled section of the hose connector that is out-of-round in a circumferential direction.

BACKGROUND

Sanitary hose connectors of the type mentioned at the outset are regularly used at the hose ends of a flexible hose line. Such flexible hose lines are increasingly used, for example to allow connecting connectors of sanitary water lines at the wall with a sanitary faucet, which is fastened to a sink. Here, the faucet is regularly assembled at the brim of the basin facing away from the user. Due to the fact that the accessibility of the coupling counterpart allocated to the hose coupling is hindered at the faucet by the sink and since the accessibility of the coupling counterpart provided at the faucet is even further hindered by the arrangement of the faucet at the brim of the basin facing away from the user, the mounting and dismantling of a flexible hose line is frequently possible with considerable difficulties only to the coupling counterpart provided at the faucet. Frequently there is insufficient clear space for a wrench or a pipe wrench to engage the hose coupling facing the faucet.

Hose couplings of prior art regularly show a tubular coupling base body. Here, the hose end of the flexible water hose pushed onto the hose connector is secured by a crimp or clamping sleeve, which in the crimped and appropriately deformed state encompasses the hose end that is pushed onto the hose connector so tightly that the hose end is pressed into the profiles provided at the hose connector. Due to the fact that this profiling is embodied rotationally symmetrical, and due to the fact that the hose end pushed onto the hose connector is therefore easily rotated in reference to the hose coupling it is usually required for a watertight connection of the hose coupling to be mounted and/or dismantled with the help of a tool engaging the hose coupling, in spite of the restricted space in the area of the sink.

From DE 19936413C1, a sanitary hose coupling is known in the art having a tube-shaped coupling base body, that on an end region of the base body includes a profiled tube connecting piece for pushing on a flexible water hose. The water hose is retained on the profiled tube connecting piece with a crimp sleeve, that in the deformed state fixes a hose end of the water hose encompassed by the crimp sleeve to the tube connecting piece. In order to fix the portion of the hose end encompassed by the crimp sleeve to the tube connecting piece in a torque-proof fashion, the hose end can be pushed onto a profiled section of the hose connecting part that is out-of-round in a circumferential direction. This out-of-round profiled section of the hose connecting part has a triangular cross-section formed from holding and supporting surfaces, that extend radially over the round cross-sectioned coupling base body. This triangular cross-sectioned profiled section cuts with the corners formed at the connection lines between the holding and supporting surfaces, deep into the elastic pliable material of the flexible water hose. Through these cuts, a weakness is created in the hose material of the water hose. In that this profile section is cut off for each rotation between the water tube and the tube connection, the risk of a functional damage induced leakage when too great of a torque is applied to the water hose.

From JP 8-226589 A, a sanitary hose coupling is known in the art that also has a profiled tube connecting piece on an end region of the base body. The tube connecting piece, onto which a flexible water hose can be pushed, includes in a direction of its length extension, two spaced-apart cross-sectional enlargements, that are enlarged in the push-on direction and on which on an opposite side of the free end have sharp corners defined by a radial plane, so that an unintended removal of the water hose from the connecting piece is practically not possible. From the cross-sectional enlargement in the pushing-on direction there is a round connecting part region in which spaced apart, longitudinally extending, anti-rotation projections are located, that engage in the elastic material and prevent a rotation of the elastic water hose relative to the connecting piece.

From U.S. Pat. No. 4,330,142, a tubing connection is known, that on a base body end region provided tube connecting piece includes similarly spaced-apart, in the connecting piece longitudinal direction, cross-sectional enlargements and cross-sectional neckings, wherein on the outer circumferential surface of he tube connecting part a plurality of ribs are provided, that here also engage in the elastic material of a water hose, to prevent the tube end from pulling off the tube connecting piece and prevent rotation of the parts relative to one another.

From the known hose couplings, the pushing on of the water hose end there is always a distinct profile cross-section, that in a general sense is not round, and that prevents a pulling off of the hose end from the hose connecting part and provides security against a relative rotation between the hose end and the hose coupling part.

Therefore, the object is to provide a sanitary hose coupling of the type mentioned at the outset, which considerably facilitates the mounting of the water hose connected thereto, even under restricted spatial conditions, wherein a degrading of the elastic material of the water hose through the application of a large rotational moment on the water hose is completely prevented.

SUMMARY

This objective is attained according to the invention in a sanitary hose coupling of the type mentioned at the outset, particularly in that the out-or-round profile is constructed with corners in the circumferential direction, in such a manner, that the corners of the out-of-round profile are connected by primary surfaces.

In the hose coupling according to the invention the hose end of the water hose encompassed by the crimped sleeve can be fixed on the hose connector in a torque-proof fashion. Simultaneously, the hose end of the water hose can be pushed onto a hose connector that is out-of-round in the circumferential direction. In particular when the crimp sleeve is crimped in the area of the out-of-round profiled section such that the crimp or clamping sleeve tightly encompasses the hose end and can press into the profiles of the hose connector, a force acting upon the hose in the circumferential direction of said hose is not automatically converted into a rotary motion of the hose in reference to the hose connector. Additionally or alternatively it is also possible that the hose material displaced into the crimped section of the crimp sleeve is displaced into the surrounding annular space of the crimp sleeve between the out-of-round profiled section on the one hand and the perhaps uncrimped section of the crimp sleeve on the other hand such that the pressing force impacting the hose material in the area of the annular space presses the hose material in a torque-proof fashion against the out-of-round profiled section. In the area of this out-of-round profiled section, the hose end pushed onto the hose connector is fixed in a torque-proof fashion, namely regardless of whether the crimp or clamping sleeve is or is not crimped in the area of the out-of-round profiled section. This way, a force acting in the circumferential direction is also applied to the hose and via said hose also to the hose connector connected therewith in a torque-proof fashion so that a screw connection can be easily established or loosened between the screw coupling on the one side and for example a sanitary faucet on the other side. The hose coupling according to the invention allows a transfer of the torque to a defined scope, if applicable. Here, the hose end of the water hose encompassed by the crimp sleeve is fixed in a torque-proof fashion on the hose connector such that the water hose allows a transfer of the torque to the hose coupling to a defined extent, and that the water hose can only be rotated without any destruction upon exceeding the defined torque, in reference to the hose coupling and/or the base body of the coupling. When the hose coupling according to the invention allows a transfer of the torque to a defined extent the hose coupling has quasi the effect of a torque wrench, i.e. slippage can only occur between the hose and the hose connector when a predetermined torque is exceeded. This slippage of the hose after a predetermined torque has been exceeded prevents any destruction of the hose by excess torsion and any collapse of the hose, which would occur if the connection between the hose and the hose connector was absolutely torque-proof. Here, the torque may be set to a value, at which an O-ring provided between the coupling base body on the one side and the connected fixture on the other side is compressed such that a fixed and tight connection is ensured in this area; when the torque predetermined in this manner is exceeded the hose can slip on the hose connector without fearing any excess torsion and thus a collapse of the hose. Thus, the hose coupling according to the invention comprises a non-destructive torque limit, which is beneficial for the safe use of the product, particularly when installed by minimally-qualified personnel, because the products manufactured using the hose coupling according to the invention cannot be damaged, here. Therefore, the hose coupling according to the invention is characterized in considerably facilitating the assembly with a water hose connected thereto, even under limited spatial conditions.

The safe and tight connection between the hose coupling according to the invention, on the one side, and the hose end pushed onto the hose connector, on the other side, is facilitated when the corners formed by the long support areas of the out-of-round profiled section each show an acute angle ≤90 degrees and/or when the out-of-round profiled section is embodied triangular or square in the circumferential direction. If the corners of the out-of-round profiled section form an acute or at the most a right angle, gripping edges form at the corners, which can particularly well engage the hose material of the water hose.

Due to the fact that the hose end must be pushed onto the hose connector of the sanitary hose coupling and since for this purpose the hose connector first expands in its diameter in the direction it is being pushed it is advantageous for the out-of-round profiled section to be provided at the sub-section of the hose connector facing away from the free end of the connector. Such a profiled section provided at the sub-section of the hose connector facing away from the free connector end may also show a greater diameter in order to allow a particularly good engagement of the hose material of the water hose, perhaps also expanded in this profiled section.

In order for the crimp or clamped sleeve, crimped on the hose connector of the hose coupling according to the invention, being be held safely and tightly at the hose coupling it is advantageous when the end section of the crimp sleeve, facing away from the free connector end and preferably projecting beyond the hose end, is deformed radially inwardly in the direction towards the coupling base body.

Here, a preferred embodiment according to the invention provides for the sleeve end section deformed radially inwardly to encompass with its facial brim pointing to the coupling base body, a round or rounded sub-section or an angular sub-section of the coupling base body in a torque-proof fashion. When the sleeve end section, deformed radially inwardly, encompasses an angular part of the coupling base body in a torque-proof fashion, an also torque-proof connection can be established between the hose coupling, the hose end pushed onto its hose connector, and the crimp sleeve. However, a preferred embodiment provides that the sleeve end section deformed radially inwardly encompasses with its facial brim, pointing to the coupling base body, a round or rounded section such that the torque-proof connection can be limited to the separating surface between the hose connector and the hose end pushed thereupon and undesired torque can be avoided between the crimp sleeve and the hose end on the one side and between the hose end and the hose connector.

In order to allow the hose end of the flexible water hose being easily pushed onto the hose connector and also being easily moved over the out-of-round profiled section it is advantageous when the hose connector at its free connector end section comprises a slide cone, conically tapering towards the free end of the connector.

A particularly resistant and strong connection between the water hose and the hose coupling according to the invention provides that at least one annular flange or annular stop is provided between the slide cone and the out-of-round profiled section. Due to the fact that at least one annular stop, provided at the hose connector, projects laterally from the hose connector this prevents the hose end from being unintentionally pulled off the hose connector.

Here, a preferred embodiment according to the invention provides that at least one annular stop conically tapers in the direction towards the free end of the connector and thus practically acts as a barb.

Additional features of the invention are discernible from the following description of an exemplary embodiment of the invention in connection with the claims as well as the drawings. The individual features can each be embodied individually or several of them combined to form an embodiment of the invention.

BRIEF DESCRIPTION OF THE DRAWINGS

It shows:

FIG. 1 a sanitary hose coupling, shown in a longitudinal cross-section, having a profiled hose connector, with one end of a flexible water hose being pushed thereupon, and fixed via a crimp sleeve crimped on the hose end, FIG. 2 the hose coupling of FIG. 1 in a cross-section through the hose connector at the section plane II-II of FIG. 1, FIG. 3 the hose coupling of FIGS. 1 and 2 in a longitudinal cross-section at the section plane of FIG. 2, FIG. 4 a detailed longitudinal cross-section of the hose connector of FIGS. 1 through 3 in the connection and transfer area of the crimp sleeve, hose coupling, and water hose, FIG. 5 the hose coupling of FIGS. 1 through 4 in a perspective view, FIG. 6 two hose couplings, comparable to FIGS. 1 through 5, in a typical installed situation, here shown in a longitudinal cross-section, with the hose couplings being fastened at the end of the body of the fixture of a sanitary faucet facing away from the water outlet, and FIG. 7 a hose coupling comparable to FIGS. 1 through 6, with a water hose being pushed onto the hose connector of this hose coupling, shown in a longitudinal cross-section, braided with a metallic or plastic cover.

DETAILED DESCRIPTION OF THE PREFERRED EMBODIMENTS

Figure 6:
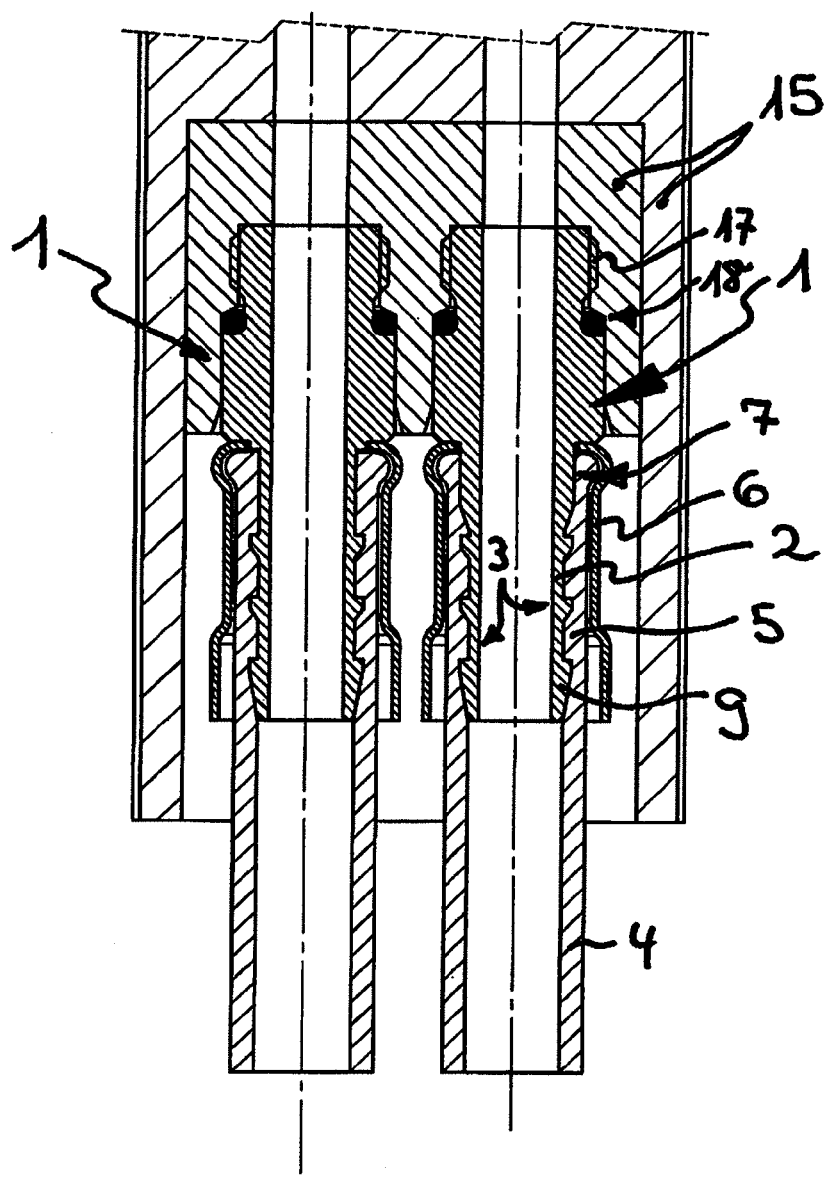

FIGS. 1 through 5 show a hose coupling 1, which comprises a tubular coupling-base body 2. At least at one of its base-body end sections, the coupling base-body 2 comprises a hose connector 3, designed for a flexible water hose 4 to be pushed thereupon. In order to counteract for the hose end 3 pushed onto the hose connector 3 being unintentionally pulled off, the hose connector 3 is embodied profiled, at least sectionally.

A crimp sleeve 6 is allocated to the hose coupling 1, which encompasses the hose end 5 that is pushed onto the hose connector 3. This crimp or clamping sleeve 6 is crimped on the hose end 5 such that in the deformed state shown here, the hose end 5 fixes the water hose 4 on the hose connector 3.

In order to allow fixing the hose end 5 of the water hose 4, encompassed by the crimp sleeve 6, on the hose connector 3 in a torque-proof fashion and to achieve a torque transfer at least to a limited extent between the hose 4 and the hose coupling 1 the hose connector 3 comprises, in its section encompassed by the hose end 5, a profiled section 7 out-of-round in the circumferential direction.

In order for a torque-proof connection developing between the hose end 5 and the hose connector 3, as resistant as possible, the out-of-round profiled section 7 is embodied angular in the circumferential direction. The corners 8 of the out-of-round profiled section 7 are connected via primary surfaces, which are embodied evenly or planar. Instead of the planar primary surfaces shown here, they may also be formed convexly or concavely, for example where a high transfer of torque is targeted. The corners 8 of this out-of-round profiled section 7 can practically engage the hose material like gripping edges when the corners formed by the long support surfaces 20 of the out-of-round profiled section 7 each form an acute angle ≤90 degrees. For this purpose, the out-of-round profiled section 7 is embodied square.

Pushing the hose end 5 onto the hose connector 3 is facilitated when the hose connector 3 in its free connector end section includes a conically tapering slide cone 9, tapering towards the free end of the connector. In order to allow providing the out-of-round profiled section 7, with a larger diameter, perhaps also widening the hose end 5, it is advantageous for the out-of-round profiled section 7 to be provided at the section of the house connector 3 facing away from the free end of the hose connector.

From FIGS. 1 through 5 it is discernible that several annular flanges or annual stops 10, 11 are provided between the slide cone 9 and the out-of-round profiled section 7, which shall also counteract that the hose end 5 is unintentionally pulled off the hose connector 3.

While the faces of the annular stops 10, 11 facing away from the water hose 4 and also the slide cone 9 are arranged in radial planes, the annular stops 10, 11 also taper in the direction towards the free end of the connector in a conical fashion such that the hose end 5 is practically held on the hose connector 3 by a barb.

From a comparison of FIGS. 1 and 5 and particularly from the detail of the longitudinal cross-section in FIG. 4 it is discernible that the sleeve end section 12 of the crimp sleeve 6 facing away from the free connector end and preferably projecting beyond the hose end 5 is deformed radially inwardly in the direction towards the coupling base body 2. Therefore the sleeve end section 12, deformed radially inwardly, encompasses with its facial brim pointing towards the coupling base body 2 a round or rounded partial section 13 of the coupling base body 2. This round partial section 13 of the coupling base body, which is encompassed by the sleeve end section 12 of the crimp sleeve 6, deformed radially inwardly, centers the crimp sleeve 6 during the assembly and particularly during crimping of the crimp sleeve 6 at the coupling base body 2. Furthermore, this round partial section 13 of the coupling base body 2, which is embodied as a cylindrical collar, may also serve as a guide for the crimp sleeve 6.

After the hose end 5 of a flexible water hose 4 has been pushed onto the hose connector 3 of the hose coupling 1 and the hose end 5 was fixed on the hose connector 3 by crimping the crimp sleeve 6 in a sleeve section a force-fitting connection is created between the hose 4 and the tubular coupling base body 2 of the hose coupling 1. Here, in the upper, not crimped sleeve end section of the crimp sleeve 6 a closed annular space 14 is created, which is filled with hose material. Due to the deformation of the crimp sleeve 6 in its crimped section the hose material is pressed, on the one hand, in the direction towards the side of the hose where it can relax due to the lack of any respective resistance; on the other hand the hose material is pressed into the annular space 14, which is limited towards the inside by the coupling base body 2 and towards the outside by the crimp sleeve 6. In this annular space 14 the hose material is stressed such that the compression acing on the hose material in the area of the annular chamber 10 presses the hose end in a torque-proof fashion against the out-of-round profiled section 7. When now a torque is applied, the coupling base body 2 can be supported on the hose material. The elasticity of the hose material is insufficient to considerably deflect the crimp sleeve 6 in the closed annular space 14 and thus allow any rotation of the coupling base body 3 in reference to the water hose 4.

Due to the embodiment according to the invention of the hose coupling 1 shown here any rotation of the coupling base body 2 is prevented in reference to the water hose 4. Thus, the water hose shown here only allows a torque transfer to an also defined extent of 1.5 Nm, for example. In order to allow or facilitate such a torque transfer to a defined extent it may be beneficial to embody the cut edges of the corners 8 formed of the out-of-round profiled section 7, obtusely or rounded as in the present case. Here, the hose end 5 of the water hose 4, encompassed by the crimp sleeve 6, is fixed in a torque-proof fashion on the hose connector 3 such that the water hose 3 without becoming damaged allows a torque transfer to the hose coupling 1 to a defined extent, with the water hose 3 only being rotational in reference to the hose coupling 1 and/or the coupling base body 2 upon the defined torque being exceeded. This way, the hose coupling 1 acts like a torque-wrench, which benefits the safe use of the product manufactured with the use of the hose coupling 1, particularly when assembled by minimally-qualified personnel, because these products cannot be preliminarily damaged.

FIG. 6 shows a typical installation situation in a longitudinal cross-section. FIG. 6 shows the lower section of the fixture body 15, facing away from the water outlet, of a sanitary faucet, otherwise not shown in greater detail. As discernible form FIG. 6, the fixture body comprises a hollow space, with two internal threads being provided in its interior for the fastening of two flexible water hoses (warm, cold). While the hose coupling 1 in FIGS. 1 through 5 shows at the end section of the coupling base body 2, facing away from the hose connector 3, an annular flange 16 for the cap nut, one exterior thread 17 with an O-ring 18 each is provided at the hose couplings 1 in FIG. 6. The hose couplings 1 with their exterior thread 17 can be screwed into the interior thread provided at the fixture body 15 until the O-rings 18 provided therebetween form a liquid-tight connection. Due to the fact that the recessed installation position of the hose couplings 1 in the fixture body 15 itself requires no use of tools it is particularly advantageous for the hose coupling 1 shown here, to allow an increased torque transfer between the water hose 4 and the coupling base body 2. As shown in the exemplary embodiment in FIG. 6, the hose end 5 of the water hose 4, encompassed by the crimp sleeve 6, is fixed in a torque-proof fashion on the hose connector 3, such that the water hose 3 allows a torque transfer to the hose coupling 1 to a defined extent. Here, the torque transferable via the water hose 3 to the hose coupling 1 is sized such and predetermined that the O-ring 18 provided between the hose coupling 1 and the fixture body 15 can be radially compressed with sufficient pressure in order to ensure a fixed and tight hose connection. When this predetermined torque is exceeded, without any destruction the hose 4 can be rotated on the hose connection 3 in reference to the hose coupling 1 and/or the coupling base body 2 without any damage of the water hose 4 being feared. Thus, even under the conditions shown as examples in FIG. 6, in which the interior thread provided in the fixture body 15 is hard to access due to narrow spatial conditions, mounting and dismantling of the hose coupling 1 is relatively easily accomplished.

Figure 7:
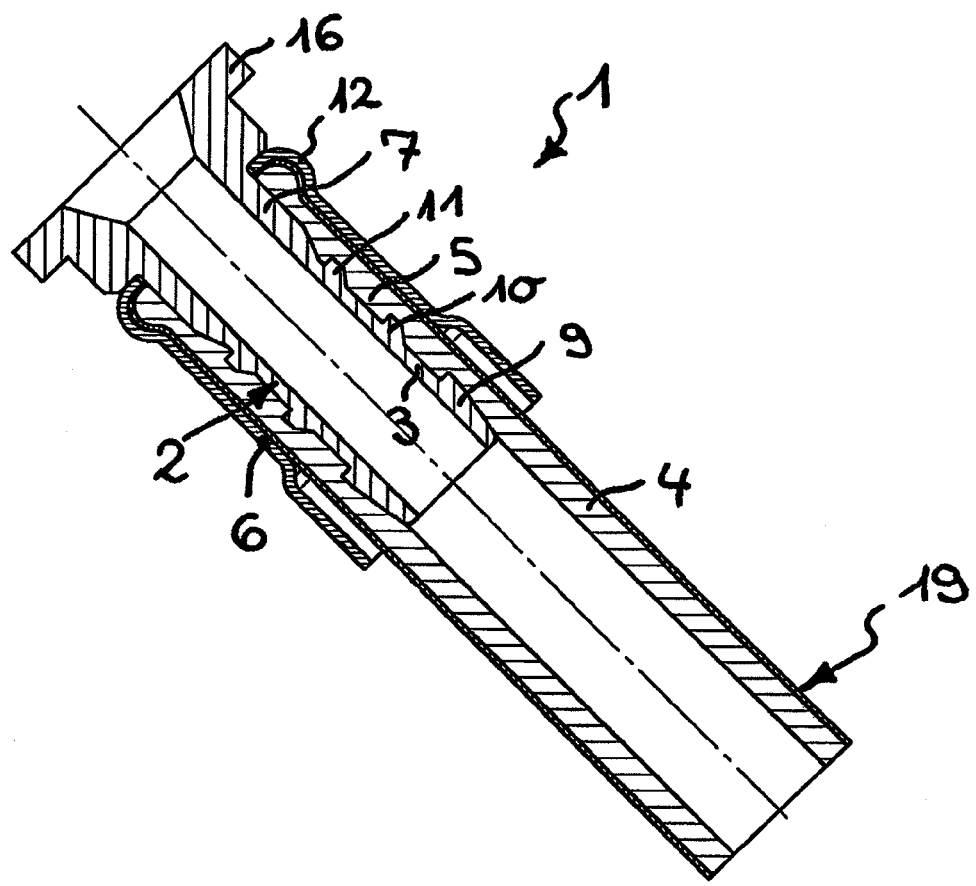

It is shown in FIG. 7 that the water hose 4 made from an elastomer material may be braided at its exterior circumference with a metallic or plastic cover 19, by which an increased compression strength of the water hose 4 can be achieved.

A hose design comparable to the one shown in FIG. 7 is not shown, in which the metallic or plastic braid 19 is additionally coated with a protective cover ensuring a hygienically smooth surface.

The invention claimed is:

1. A sanitary hose coupling (1) comprising a tubular coupling base body (2), which at least at a base body-end section comprises a hose connector (3), profiled at least sectionally, to be pushed onto a flexible water hose (4), as well as a crimp sleeve (6), that in a deformed state fixes a hose end (5) of the water hose (4) encompassed by the crimp sleeve (6) on the hose connector (3) in a water tight manner, wherein the hose end (5) encompassed by the crimp sleeve (6) fixes the water hose (4) on the hose connector (3) in a torque-proof fashion with the hose end (5) being located on a profiled section (7) of the hose connector (3) that is out-of-round in a circumferential direction, the out-of-round profiled section (7) is embodied generally square or triangular in a circumferential direction, wherein corners of the out-of-round profiled section comprise cut edges.

2. A hose coupling according to claim 1, wherein the corners (8) of the out-of-round profiled section (7) each form an acute angle ≤90 degrees.

3. A hose coupling according to claim 1, wherein the out-of-round profiled section (7) is provided at a section of the hose connector (3) facing away from a free end of the connector.

4. A hose coupling according to claim 3, wherein a sleeve end section (12) of the crimp sleeve (6), at a side facing away from sleeve and projecting beyond the hose end (5) is deformed radially inwardly in a direction of the coupling base body (2).

5. A hose coupling according to claim 4, wherein the sleeve end section (12), deformed radially inwardly, encompasses with its facial brim facing the coupling base body (2), a round or rounded section (13) or in a torque-proof fashion an angular section of the coupling base body (2).

6. A hose coupling according to claim 1, wherein the hose connector (3) comprises a slide cone (9) at a free connector end section thereof tapering conically towards a free end of the connector.

7. A hose coupling according to claim 6, wherein at least one annular flange or an annular stop (10, 11) is provided between the slide cone (9) and the out-of-round profiled section (7).

8. A hose coupling according to claim 7, wherein the at least one annular stop (10, 11) conically tapers in the direction of the free end of the connector.

* * * * *